J. H. TUBBERGEN.
AUTO WARNING SIGNAL.
APPLICATION FILED APR. 25, 1921.
1,395,461.
Patented Nov. 1, 1921.
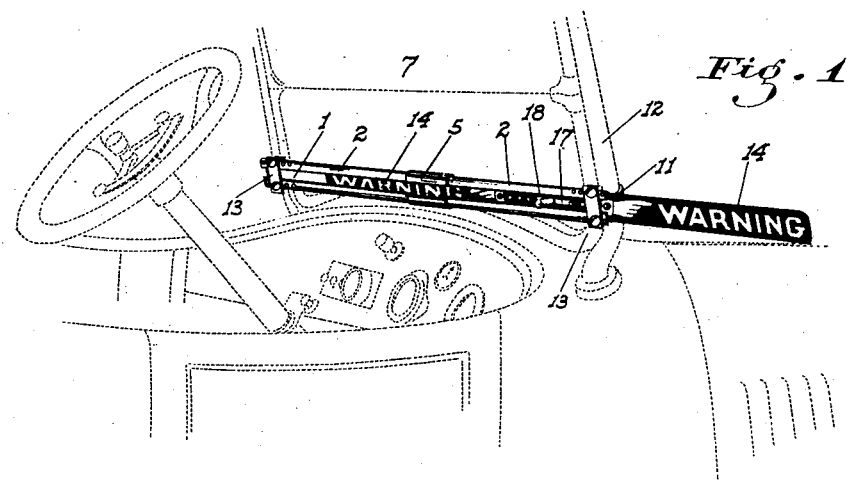
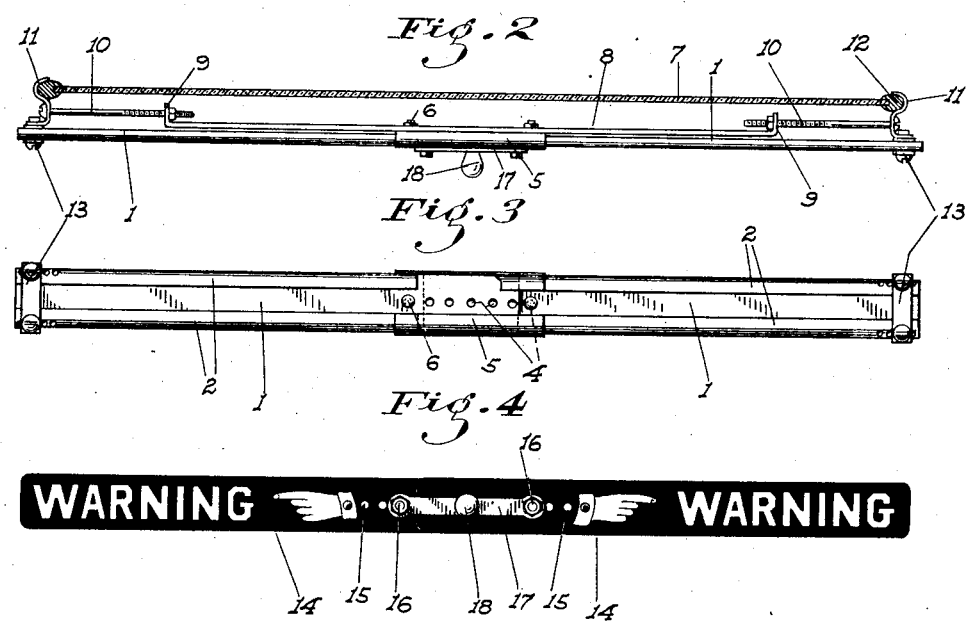
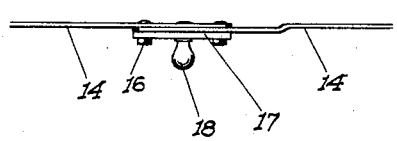
INVENTOR.
J. H. Tubbergen
BY
ATTORNEY

UNITED STATES PATENT OFFICE.

JOHANNES H. TUBBERGEN, OF AFTON, CALIFORNIA.

AUTO WARNING-SIGNAL.

1,395,461.   Specification of Letters Patent.   Patented Nov. 1, 1921.

Application filed April 25, 1921. Serial No. 464,418.

*To all whom it may concern:*

Be it known that I, JOHANNES H. TUBBERGEN, a citizen of the United States, residing at Afton, county of Glenn, State of California, have invented certain new and useful Improvements in Auto Warning-Signals; and I do declare the following to be a full, clear, and exact description of the same, reference being had to the accompanying drawings, and to the characters of reference marked thereon, which form a part of this application.

This invention relates to improvements in direction or warning signals for vehicles, especially automobiles, motor trucks and the like.

The principal object of the invention is to provide a signal device which may be seen from both ends of the vehicle, which may be projected from either side at will, depending on the direction toward which the driver intends turning, and which is so constructed that it may readily be adjusted and adapted for attachment to any width of a windshield or dash board.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Figure 1 is a perspective outline of the front end of an automobile showing my improved signal device attached to the windshield.

Fig. 2 is a top plan view of the device.

Fig. 3 is a front elevation of the signal casing members detached.

Fig. 4 is a similar view of the signal members detached.

Fig. 5 is a fragmentary top plan of the signal members.

Referring now more particularly to the characters of reference on the drawings, the numeral 1 denotes a pair of detached and flat casing members, of rectangular shape and relatively narrow, the vertical edges being turned over for the greater portion of their length to form guide flanges 2, which extend parallel to the main body of the casings and are spaced somewhat therefrom.

The casings are adapted to be arranged in continuous alinement, the flanges 2 being omitted for a certain distance from their adjacent ends as at 3, such portions being adapted to be overlapped and being each provided with a plurality of horizontally alined orifices 4. The portions 3 are adapted to be slid into a sleeve member 5 and to be secured thereto by removable bolts or rivets 6, the sleeve 5 being symmetrical in cross section to the flanged portions of the casing.

To the back of the sleeve 5, that is on the face thereof adjacent the windshield 7, is attached a rigid bar 8, the same bolts 6 being used as are employed to connect the casings to the sleeve.

Each end of the bar is turned away from the casings to form flanges 9, through which pass adjustable bolts 10 connected at their outer ends to clamping members 11 adapted to engage the side frames 12 of the windshield. The members 11 are provided with clamping bars 13 adapted to be adjustably screwed to the casings 1 adjacent their outer ends, thus rigidly maintaining the horizontal alinement of the parts without any undue strain on any bolts or other parts.

Slidably mounted in the casings are separate signal plates 14, preferably provided on both faces with some easily seen wording as for instance is shown in Fig. 4, which will be readily visible from both front and rear when projected from the casing.

The adjacent end portions of the plates are adapted to overlap and are provided with a plurality of horizontally alined holes 15, any of which at a time are adapted to receive bolts or screws 16 connected to a rigid bar 17 extending between the plates and holding them in spaced relation, the arm having a knob or handle 18 thereon which is also bolted to the signal members.

To install the device, the casings may first be assembled with the central sleeve to give whatever over all length is desired or necessary to fit a certain sized windshield, preferably in such a manner that the opposite ends of the casings are about flush with the edges of the windshield. The signal plates are also assembled with the connecting arm 17 so that the overall length is about the same as that of the casings. The bar and windshield clamps are then adjusted to suit the windshield and casings and are secured in place.

To use the signal, it is of course only necessary to move the handle 18 to one side or the other to project one of the signal plates beyond the casing on the side of the vehicle toward which the handle is moved, the handle bar 17 abutting against the outer clamping bar 13 at either end to limit the outward movement of the signal arm.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is,—

1. A signal device comprising a pair of casings provided with horizontally disposed guide flanges, means for connecting the casings together to hold then in continuous alinement while permitting their overall length to be altered, said casings being adapted to be removably attached to a vehicle, and a pair of signal plates disposed between the guide flanges and adjustably connected together to allow their overall length to be altered.

2. A signal device comprising a pair of horizontally alined and spaced casings provided with overturned edge flanges to receive sliding signal plates therebetween, a central casing member overlapping the adjacent ends of the first named casings and adjustably connected thereto whereby the overall length of the structure may be altered, a rigid bar secured to the central member and extending lengthwise of and behind the other casing members, windshield clamps fixed to the casing members adjacent the outer ends thereof and arranged for longitudinal adjustment thereon and take-up bolts extending from the clamps to the outer ends of the rigid bar and substantially parallel thereto, whereby the clamps may be rigidly held against the windshield.

In testimony whereof I affix my signature.

JOHANNES H. TUBBERGEN.